(12) United States Patent
Bergin et al.

(10) Patent No.: US 12,031,080 B2
(45) Date of Patent: Jul. 9, 2024

(54) FLAME- AND SMOKE-RETARDANT ADHESIVE PACKAGES AND INSULATION PRODUCTS

(71) Applicant: Winona Building Products, LLC, Etna Green, IN (US)

(72) Inventors: John F. Bergin, Wisconsin Rapids, WI (US); James Herbert Stoken, Allegan, MI (US)

(73) Assignee: Winona Building Products, LLC, Etna Green, IN (US)

( * ) Notice: Subject to any disclaimer, the term of this patent is extended or adjusted under 35 U.S.C. 154(b) by 1184 days.

(21) Appl. No.: 16/273,517

(22) Filed: Feb. 12, 2019

(65) Prior Publication Data

US 2019/0276745 A1 Sep. 12, 2019

Related U.S. Application Data

(60) Provisional application No. 62/779,542, filed on Dec. 14, 2018, provisional application No. 62/630,443, filed on Feb. 14, 2018.

(51) Int. Cl.
*B32B 5/18* (2006.01)
*B32B 7/12* (2006.01)
(Continued)

(52) U.S. Cl.
CPC .......... *C09K 21/04* (2013.01); *B32B 7/12* (2013.01); *C09J 7/383* (2018.01); *C09J 11/04* (2013.01);
(Continued)

(58) Field of Classification Search
None
See application file for complete search history.

(56) References Cited

U.S. PATENT DOCUMENTS 4,177,181 A * 12/1979 Tsurumi .................. C08L 21/02
524/823
4,989,794 A * 2/1991 Askew .................... C09C 1/407
241/20
(Continued)

FOREIGN PATENT DOCUMENTS

| EP | EU 3 174 924 | 9/2018 |
| WO | WO 2013/048675 | 4/2013 |
| WO | WO 2016/018484 | 2/2016 |

OTHER PUBLICATIONS

Kemgard. Flame Retardant/Smoke Suppressant. Hubert Fire Retardant Additives.
(Continued)

*Primary Examiner* — Scott R. Walshon
*Assistant Examiner* — Thomas A Mangohig
(74) *Attorney, Agent, or Firm* — Woodard, Emhardt, Henry, Reeves & Wagner, LLP

(57) ABSTRACT

An antimony-free adhesive package useful for making an insulation facing material includes a halogenated latex adhesive, a flame/smoke suppressant such as aluminum trihydrate, an intumescent such as aluminum polyphosphate, melamine powder, a melamine cyanurate, a mold and mildew inhibitor, an optional dispersant, an optional water holding agent, and optionally between 3% and 10% of a zinc molybdate/magnesium silicate complex and between 3% and 10% of a zinc phosphate/zinc oxide complex. Insulation facing material made with the adhesive package has a "flame spread" value that does not exceed 25, and a "smoke developed" value that does not exceed 50, and meets the applicable standards for operating temperature, anti-corrosiveness, corrosion, puncture resistance, water vapor transmission, water vapor sorption, shrinkage, microbial growth resistance, and water immersion bond integrity. The facing (Continued)

stock may be used to face insulation products such as rolls, batts, boards or molds of fiberglass or mineral wool insulation.

23 Claims, 4 Drawing Sheets

(51) Int. Cl.

| | | |
|---|---|---|
| *C09J 7/38* | (2018.01) | |
| *C09J 11/04* | (2006.01) | |
| *C09J 11/06* | (2006.01) | |
| *C09J 11/08* | (2006.01) | |
| *C09K 21/04* | (2006.01) | |
| *E04B 1/76* | (2006.01) | |
| *E04B 1/94* | (2006.01) | |
| *H01B 3/18* | (2006.01) | |
| *C08K 3/22* | (2006.01) | |
| *C08K 3/32* | (2006.01) | |
| *E04B 1/74* | (2006.01) | |

(52) U.S. Cl.
CPC ............ *C09J 11/06* (2013.01); *C09J 11/08* (2013.01); *E04B 1/7608* (2013.01); *E04B 1/946* (2013.01); *H01B 3/18* (2013.01); *C08K 3/22* (2013.01); *C08K 2003/2255* (2013.01); *C08K 2003/2296* (2013.01); *C08K 2003/321* (2013.01); *C09J 2301/408* (2020.08); *C09J 2401/00* (2013.01); *C09J 2415/00* (2013.01); *E04B 2001/742* (2013.01)

(56) References Cited

U.S. PATENT DOCUMENTS

| | | | |
|---|---|---|---|
| 6,943,207 B2 | 9/2005 | Chanak et al. | |
| 7,049,036 B1 | 5/2006 | Satou et al. | |
| 7,420,007 B2 | 9/2008 | Bauer et al. | |
| 7,749,923 B2 | 7/2010 | Moore et al. | |
| 8,415,415 B2 | 4/2013 | Karayianni et al. | |
| 9,307,692 B2 | 4/2016 | Boday et al. | |
| 9,534,109 B2 | 1/2017 | Hoerold et al. | |
| 9,752,009 B2 | 9/2017 | Stockdale et al. | |
| 9,752,011 B2 | 9/2017 | Stockdale et al. | |
| 9,758,640 B2 | 9/2017 | Stockdale et al. | |
| 11,608,472 B2 | 3/2023 | Cha et al. | |
| 2002/0040089 A1 | 4/2002 | Ouchi | |
| 2002/0086928 A1 | 7/2002 | Ouchi | |
| 2004/0141114 A1 | 7/2004 | Yoshii et al. | |
| 2005/0031843 A1 | 2/2005 | Robinson et al. | |
| 2005/0143503 A1 | 6/2005 | Bauer et al. | |
| 2005/0222309 A1 | 10/2005 | Bauer et al. | |
| 2005/0272839 A1 | 12/2005 | Bauer et al. | |
| 2006/0020064 A1 | 1/2006 | Bauer et al. | |
| 2006/0040122 A1* | 2/2006 | Carlson | B32B 29/00 428/537.7 |
| 2006/0214144 A1 | 9/2006 | Bauer et al. | |
| 2006/0217469 A1 | 9/2006 | Bauer et al. | |
| 2006/0226404 A1 | 10/2006 | Bauer et al. | |
| 2007/0251721 A1 | 11/2007 | Kuchi et al. | |
| 2008/0081138 A1* | 4/2008 | Moore | F16L 59/023 428/36.1 |
| 2008/0241529 A1 | 10/2008 | Bauer et al. | |
| 2011/0254235 A1 | 10/2011 | Abe et al. | |
| 2012/0289628 A1* | 11/2012 | Ceulemans | C08L 33/02 524/48 |
| 2013/0075138 A1 | 3/2013 | Yu et al. | |
| 2016/0032076 A1 | 2/2016 | Stockdale et al. | |
| 2016/0264761 A1 | 9/2016 | Timberlake et al. | |
| 2017/0073502 A1 | 3/2017 | Timberlake et al. | |
| 2018/0339950 A1 | 11/2018 | Tyler et al. | |

OTHER PUBLICATIONS

Puri et al., "Intumescent coatings: A review on recent progress", J. Coat. Technol. Res., 14 (1) 1-20, 2017.

* cited by examiner

FLAME- AND SMOKE-RETARDANT ADHESIVE PACKAGES AND INSULATION PRODUCTS

CROSS-REFERENCE TO RELATED APPLICATIONS

This application claims priority from U.S. Provisional Patent Application Ser. No. 62/630,443, filed Feb. 14, 2018, and from U.S. Provisional Patent Application Ser. No. 62/779,542, filed Dec. 14, 2018. The entire contents of these related applications are hereby incorporated herein by reference.

FIELD OF THE INVENTION

The present invention relates generally to adhesive packages, and more particularly to antimony-free, flame- and smoke-retardant adhesive packages useful for making insulation facing stock and other building products.

BACKGROUND TO THE INVENTION

Building insulation is often provided as batts, rolls, boards, molds (pipe) of a fiberglass, mineral wool material. Such insulation products are frequently laminated with an FSK (foil/scrim/kraft paper) or PSK (polypropylene/scrim/kraft) facing which serves as a vapor retarder or an insulation facing. Other combinations include, but are not limited to PSKP (polypropylene/scrim/kraft/polyester), FSKF (foil/scrim/kraft/foil), PSP (polypropylene/scrim/polyester), FP (foil/polyester), P-Fabric (polypropylene/fabric), F-Fabric (foil/fabric), FPSF-(foil/polyester/scrim/foil).

These facing materials are typically made using an antimony-based adhesive blended with a halogenated polymer package. While the antimony/halogenated compound blend provides good flame and smoke resistance, it is a hazardous material that many insulation manufactures would prefer to avoid.

A need therefore exists for an antimony-free adhesive package that provides effective flame- and smoke-resistance and is therefore useful for insulation facing stock and for other building material applications. The present invention addresses that need.

SUMMARY OF THE INVENTION

One aspect of the present invention provides an antimony-free, adhesive package useful for making an insulation facing stock and/or other building materials. The antimony-free adhesive package may comprise a zinc molybdate/magnesium silicate complex and a zinc phosphate/zinc oxide complex. In such embodiments, a halogenated latex adhesive, a flame quench/smoke suppressant, an intumescent, an inert gas generator, a salt-free and red-list-free flame retardant, a mold and mildew inhibitor, and a dispersant. A water holding agent is also preferably included. The antimony-free, adhesive packages of the present invention are particularly useful to provide FSK (foil, scrim, Kraft paper layers) and PSK (polypropylene, scrim, and Kraft paper layers) facing stock.

In other embodiments the antimony-free adhesive package used to make the inventive insulation facing stock does not include a zinc molybdate/magnesium silicate complex or a zinc phosphate/zinc oxide complex, but does include a halogenated latex adhesive, a flame quench/smoke suppressant, an intumescent, an inert gas generator, a salt-free and red-list-free flame retardant, a mold and mildew inhibitor, and a dispersant. Here too, a water holding agent is also preferably included.

When a zinc molybdate/magnesium silicate complex and a zinc phosphate/zinc oxide complex are included, the antimony-free adhesive packages of the present invention may comprise:

1) between 3% and 10%, and more preferably between 3.5% and 8%, and most preferably about 4%, of a zinc molybdate/magnesium silicate complex;
2) between 3% and 10%, and more preferably between 3.5% and 10%, and most preferably about 4%, of a zinc phosphate/zinc oxide complex;
3) between 13% and 26%, and more preferably between 15% and 22%, and most preferably between 16% and 18%, of a halogenated latex adhesive;
4) between 22% and 50%, and more preferably between 25% and 45%, and most preferably between 30% and 40%, aluminum trihydrate;
5) between 2% and 8%, and more preferably between 4% and 6%, and most preferably about 5%, ammonium polyphosphate;
6) between 10% and 25%, and more preferably between 10% and 20%, and most preferably between 15% and 17%, melamine;
7) between 10% and 25%, and more preferably between 13% and 22%, and most preferably between 16% and 20%, melamine cyanurate;
8) between 0.5% and 3%, and more preferably between 1% and 2%, and most preferably between 1% and 1.4%, of a carbamate-based mold and mildew inhibitor; and
9) between 0.5% and 2.5%, and more preferably between 0.8% and 2%, and most preferably between 1% and 1.5%, of a dispersant.

In the most preferred embodiments these formulations also include between 0.0001% and 2%, and more preferably between 0.001% and 1%, and most preferably about 0.01%, of a water holding agent such as carboxymethyl cellulose.

When a zinc molybdate/magnesium silicate complex and a zinc phosphate/zinc oxide complex are not included, the antimony-free adhesive packages of the present invention preferably comprise:

1) between 13% and 26%, and more preferably between 15% and 22%, and most preferably between 16% and 18%, of a halogenated latex adhesive;
2) between 20% and 60%, and more preferably between 30% and 50%, and most preferably between 35% and 45%, aluminum trihydrate;
3) between 2% and 10%, and more preferably between 4% and 7%, and most preferably between 5% and 6%, ammonium polyphosphate;
4) between 10% and 25%, and more preferably between 10% and 20%, and most preferably between 15% and 18%, melamine;
5) between 10% and 25%, and more preferably between 13% and 22%, and most preferably between 16% and 20%, melamine cyanurate;
6) between 0.5% and 5%, and more preferably between 1% and 2%, and most preferably between 1% and 1.4%, of a carbamate-based mold and mildew inhibitor; and
7) between 0.5% and 2.5%, and more preferably between 0.8% and 2%, and most preferably between 1% and 1.5%, of a dispersant.

In the most preferred embodiments these formulations also include between 0.0001% and 2%, and more preferably between 0.001% and 1%, and most preferably about 0.01%, of a water holding agent such as carboxymethyl cellulose.

Another aspect of the present invention provides an insulation facing material comprising a multiplicity of facing material layers laminated together with one of the adhesive packages described above.

Another aspect of the present invention provides an antimony-free insulation product made using the inventive antimony-free facing stock. The insulation product may comprise a roll, batt, board, mold, etc. of insulation material that is faced with the inventive antimony-free and red-list-free facing material.

DESCRIPTION OF THE PREFERRED EMBODIMENTS

Figure 1:
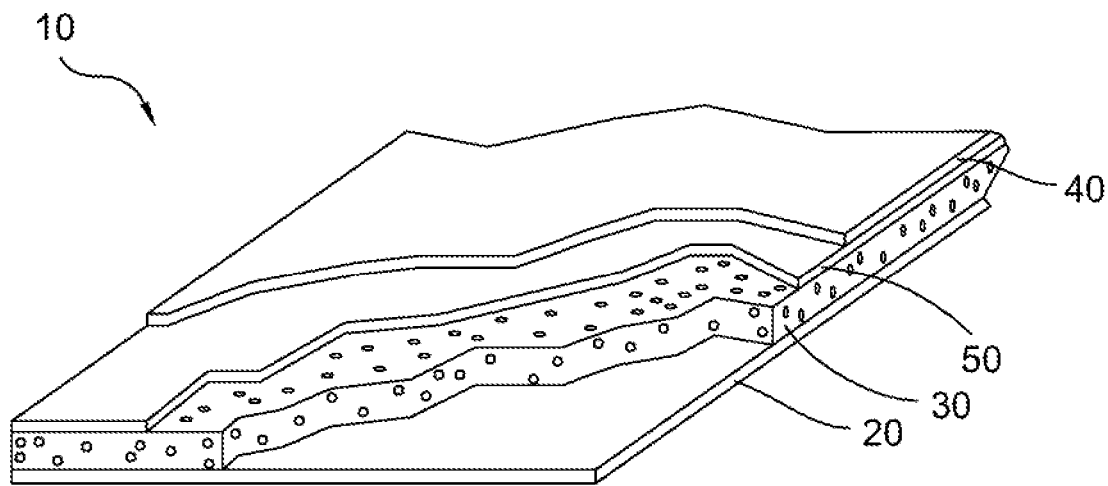
FIG. 1 shows the components used to make an insulation facing material effective for use on building insulation products, according to one preferred embodiment.

For the purposes of promoting an understanding of the principles of the invention, reference will now be made to certain embodiments and specific language will be used to describe the same. It will nevertheless be understood that no limitation of the scope of the invention is thereby intended, with such alterations and modifications being contemplated as would normally occur to persons skilled in the art to which the invention relates.

The present invention addresses problems known to the art by facilitating the manufacture of "red list" free, flame- and smoke-retardant insulation materials. One aspect of the present invention provides an antimony-free adhesive package effective for use in an insulation facing product. Another aspect of the present invention provides an antimony-free insulation facing material effective for use on insulation products. Another aspect of the present invention provides antimony-free insulation products.

One embodiment of the antimony-free adhesive package of the present invention comprises both a zinc molybdate/magnesium silicate complex and a zinc phosphate/zinc oxide complex, preferably packaged with other ingredients as more fully described below. The combination of a zinc molybdate/magnesium silicate complex and a zinc phosphate/zinc oxide complex has proven surprisingly effective for replacing the antimony-containing flame and/or smoke suppressants that have previously been used in insulation products.

In one preferred embodiment the antimony-free adhesive package of the present invention comprises a zinc molybdate/magnesium silicate complex, a zinc phosphate/zinc oxide complex, a halogenated latex adhesive, a flame quencher and/or smoke suppressant such as aluminum trihydrate, an intumescent such as ammonium polyphosphate, an inert gas generator such as melamine, a salt-free and red-list-free flame retardant such as melamine cyanurate, a mold and mildew inhibitor, and at least one dispersant. Other components, such as water holding agents and/or cross-linkers, may also be included if needed.

A particularly preferred embodiment of such an antimony-free adhesive package comprises a zinc molybdate/magnesium silicate complex, a zinc phosphate/zinc oxide complex, a carboxylated vinylidene halogenated butadiene latex adhesive, aluminum trihydrate, ammonium polyphosphate, melamine, a melamine cyanurate, a carbamate mold and mildew inhibitor such as an IPBC-based fungistat, a water-holding agent such as CMC, and a hydrophobic copolymer polyelectrolyte dispersant.

Another embodiment of such an antimony-free adhesive package comprises a zinc molybdate/magnesium silicate complex, a zinc phosphate/zinc oxide complex, a carboxylated vinylidene halogenated butadiene latex adhesive, aluminum trihydrate, ammonium polyphosphate, melamine, a melamine cyanurate, an isothiazolinone-active mold and mildew inhibitor, an ammonium zirconium carbonate cross-linking agent, and a hydrophobic copolymer polyelectrolyte dispersant.

As previously indicated, the antimony-free adhesive package of the present invention need not include a zinc molybdate/magnesium silicate complex or a zinc phosphate/zinc oxide complex. In such embodiments the antimony-free adhesive package may include a salt-free and red-list-free flame retardant, a halogenated latex adhesive, melamine, aluminum trihydrate, ammonium polyphosphate, a mold and mildew inhibitor, and at least one dispersant. As with the packages that include a zinc molybdate/magnesium silicate complex or a zinc phosphate/zinc oxide complex, other components, such as cross-linkers, may also be included if needed.

In one preferred embodiment of the zinc molybdate/magnesium silicate complex-free adhesive package of the present invention, the adhesive package comprises a halogenated latex adhesive, a flame quencher and/or smoke suppressant such as aluminum trihydrate, an intumescent such as ammonium polyphosphate, an inert gas generator such as melamine, a salt-free and red-list-free flame retardant such as melamine cyanurate, a mold and mildew inhibitor, and at least one dispersant. Other components, such as cross-linkers, may also be included if needed.

A particularly preferred embodiment of a zinc molybdate/magnesium silicate complex-free adhesive package comprises a carboxylated vinylidene halogenated butadiene latex adhesive, aluminum trihydrate, ammonium polyphosphate, melamine, a melamine cyanurate, a carbamate mold and mildew inhibitor such as an IPBC-based fungistat, a water-holding agent such as CMC, and a hydrophobic copolymer polyelectrolyte dispersant.

Another embodiment of such a zinc molybdate/magnesium silicate complex-free adhesive package comprises a carboxylated vinylidene halogenated butadiene latex adhesive, aluminum trihydrate, ammonium polyphosphate, melamine, a melamine cyanurate, an isothiazolinone-active mold and mildew inhibitor, an ammonium zirconium carbonate crosslinking agent, and a hydrophobic copolymer polyelectrolyte dispersant.

When used, the zinc molybdate/magnesium silicate complex may be provided in an amount ranging from about 1% to about 15% by weight, with an amount ranging from about 2% to about 12% by weight being more preferred, an amount ranging from about 3.5% to about 10% by weight being even more preferred, and an amount of about 4% being most preferred. In one preferred embodiment the zinc molybdate/magnesium silicate complex is the material sold under the trade name Kemgard 911c by the J. M. Huber Corp. The zinc molybdate/magnesium silicate complex acts as a prime smoke suppressant, and also contributes to char formation.

When used, the zinc phosphate/zinc oxide complex may be provided in an amount ranging from about 1% to about 15% by weight, with an amount ranging from about 2% to about 12% by weight being more preferred, an amount ranging from about 3.5% to about 10% by weight being even more preferred, and an amount of about 4% being most preferred. In one preferred embodiment, the zinc phosphate/zinc oxide complex is the material sold under the trade name Kemgard 981 by the J. M. Huber Corp. The zinc phosphate/zinc oxide complex contributes to char formation.

Regardless of whether a zinc molybdate/magnesium silicate complex and/or a zinc phosphate/zinc oxide complex are used, a halogenated latex adhesive is preferably used in the inventive adhesive packages. The halogenated latex adhesive may be a carboxylated vinylidene halogenated butadiene latex adhesive, and may be provided in an amount ranging from about 13% to about 26% by weight, with an amount ranging from about 15% to about 22% by weight being more preferred, and an amount of about 16% to about 18% being most preferred. In one preferred embodiment, the carboxylated vinylidene halogenated butadiene latex adhesive is a vinyl chloride butadiene latex adhesive sold under the trade name DL 259 by the Trinseo Corp.

Also regardless of whether a zinc molybdate/magnesium silicate complex and/or a zinc phosphate/zinc oxide complex is used, a flame quench and smoke suppressant such as aluminum trihydrate (alternatively referred to as alumina trihydrate, $Al_2O_3 \cdot 3H_2O$, or ATH) is preferably included. The ATH is preferably included in an amount ranging from about 20% to about 60% by weight, with an amount ranging from about 25% to about 50% by weight being more preferred, and an amount of about 30% to about 45% being most preferred. The aluminum trihydrate releases water of hydration at 220° C., acting as a flame quench and smoke suppressant. It is also an inert pigment and water resistant.

An intumescent such as ammonium polyphosphate (APP) is also preferably included. The APP may be provided in an amount ranging from about 2% to about 10% by weight, with an amount ranging from about 4% to about 7% by weight being more preferred, and an amount of about 5% to about 6% being most preferred. In the preferred embodiments, the ammonium polyphosphate is provided in a very fine particle size and phase II crystalline form with high degree of polymerization (n>1000). It is almost insoluble in water, and is used as an intumescent and is synergistic with ATH.

A melamine powder is also preferably included. The melamine may be provided in an amount ranging from about 10% to about 25% by weight, with an amount ranging from about 10% to about 20% by weight being more preferred, and an amount of about 15% to about 18% being most preferred. The melamine is used as an inert gas generator when it vaporizes, displacing oxygen.

A salt-free and "Red List"-free flame retardant such as melamine cyanurate is also preferably included in the inventive formulations. The melamine cyanurate may be provided in an amount ranging from about 10% to about 25% by weight, with an amount ranging from about 13% to about 22% by weight being more preferred, and an amount of about 16% to about 20% being most preferred. In one preferred embodiment the melamine cyanurate is the material sold under the trade name Melapur® MC25 by BASF.

A mold and mildew inhibitor, which may also be a bactericide, is also preferably included. The mold and mildew inhibitor/bactericide may be a zero VOC, water dispersed fungistat for aqueous based material. In a preferred embodiment the mold and mildew inhibitor is free of isothiazolinones, and is most preferably a carbamate based on the active ingredient IPBC (3-Iodo-2-propynylbutylcarbamate), such as Polyphase® 678 by the Troy Corporation. When a carbamate-based fungistat is used, it is preferably provided in an amount ranging from about 0.5% to about 5% by weight, with an amount ranging from about 1% to about 2% by weight being more preferred, and an amount of about 1% to about 1.4% being most preferred.

Alternatively, the mold and mildew inhibitor may be an isothiazolinone-active mold and mildew inhibitor, and may be provided in an amount ranging from about 0.1% to about 1.6% by weight, with an amount ranging from about 0.5% to about 0.7% by weight being more preferred. In one preferred embodiment, the mold and mildew inhibitor/bactericide is an isothiazolinone-active mold and mildew inhibitor sold under the trade name Isocil by the Lonza organization. The isothiazolinone-active mold and mildew inhibitor inhibits mold and mildew, and also acts as a bactericide.

In some embodiments at least one dispersant is also included. The dispersant may be a hydrophobic copolymer polyelectrolyte dispersant and/or a non-corrosive, non-ionic polyelectrolyte dispersant, and may be provided in an amount ranging from about 0.5% to about 2.5% by weight, with an amount ranging from about 0.8% to about 2% by weight being more preferred, an amount ranging from about 1% to about 1.5% being most preferred. In one preferred embodiment, the dispersant is a hydrophobic copolymer polyelectrolyte sold under the trade name Tamol™ by the Dow Chemical company.

In some embodiments a water holding agent is also used. In the context of this invention a water-holding or water-retention agent is as additives which improve the ability of the coating to hold the water or vehicle within the coating after application. Examples of water retention agents include: carboxy methyl cellulose (CMC); galactomannan phosphoric ester (GPE); ethyl hydroxyethyl cellulose; methyl ethyl hydroxyethyl cellulose; polyacrylates; hydrophobically modified alkali-swellable emulsions; alkali-swellable acrylic emulsions; starches; carrageenans; gums; and proteins.

For example, carboxymethyl cellulose may be dispersed in water to make a 5% CMC dispersion. That dispersed CMC may then be added to the tank in which the adhesive will be mixed at a level effective to provide an effective amount of CMC in the formulation. In the preferred embodiments the water holding agent may be provided in an amount ranging from about 0.0001% to about 2% by weight, with an amount ranging from about 0.001% to about 1% by weight being more preferred, and an amount of about 0.01% being most preferred.

A crosslinking agent such as ammonium zirconium carbonate may also be included. When used, the ammonium zirconium carbonate crosslinking agent may be provided in an amount ranging from about 0.1% to about 4% by weight, with an amount ranging from about 0.6% to about 0.8% by weight being more preferred. In one preferred embodiment, the ammonium zirconium carbonate crosslinking agent is the material sold under the trade name AZCOTE 5800.

The adhesive package of the present invention is antimony-free as stated above. Additionally, in certain embodiments the antimony-free adhesive package is also free, or substantially free, of halogens, including bromides generally, and particularly being free of organobromides. In other embodiments the adhesive package is free of antimony, and is also free, or substantially free, of chemicals listed on the International Living Future Institute's "Living Building Challenge 3.0 Red List Chemical Guide" published July 2014, the entire contents of which are incorporated herein by reference. For the purpose of this disclosure, the term "Red List free" formulation shall mean a formulation that does not include any of the chemicals or materials listed on the Living Future Institute's "Living Building Challenge 3.0 Red List Chemical Guide" published July 2014. Similarly, the term "substantially Red List free" formulations are formulations that are substantially free of any of the chemicals or materials listed on the Living Future Institute's "Living Building Challenge 3.0 Red List Chemical Guide" published July 2014. The LBC Red List includes alkylphenols; asbestos; Bisphenol A; cadmium; chlorinated polyethylene and chlorosulfonated polyethylene, except HDPE and LDPE; chlorobenzenes; chlorofluorocarbons; hydrochlorofluorocarbons; chloroprenes; chromium VI; lead; chlorinated polyvinyl chloride; formaldehyde; low molecular weight halogenated flame retardants; mercury; polychlorinated biphenyls; perfluorinated compounds; phthalates; polyvinyl chloride; chlorinated polyvinyl chloride; polyvinylidene chloride; short chain chlorinated paraffins; creosote; arsenic; wood treatments containing creosote, arsenic or pentachlorophenol; and volatile organic compounds (VOCs) in wet applied products.

One method for making the inventive adhesive package includes dispersing carboxymethylcellulose (CMC) in water. Preferably about 5 #of CMC is dispersed in about 100#of water. The dispersed CMC is then pumped into another tank at a level effective to provide about 0.5% dispersed CMC on the dry, fire-retardant materials (i.e., the materials that contribute to fire retardancy and/or smoke suppression, such as the melamine powder, the melamine cyanurate, the ATH, the APP, and the zinc molybdate/magnesium silicate complex and/or a zinc phosphate/zinc oxide complex if used, but not the latex, or the crosslinker(s), or the dispersant(s), or the carboxymethyl cellulose, or the mold and mildew inhibitor/bactericide). ATH is then added and allowed to disperse completely. The latex adhesive is added, and then the APP, and is allowed to disperse completely. The melamine cyanurate is then mixed in, as is the melamine. When a mold/mildew inhibitor is used, it is added as well.

When a zinc molybdate/magnesium silicate complex and a zinc phosphate/zinc oxide complex are included they are added in-line after the previous mixture/dispersion has been made. The crosslinking agent is also added inline after the zinc molybdate/magnesium silicate complex and a zinc phosphate/zinc oxide complex have been added, with the crosslinking agent being added in proportion to the consumption rate at the feed to run tank.

The inventive antimony-free adhesive package may be used to make an antimony-free insulation facing stock. The antimony-free insulation facing stock typically comprises layers of foil and/or plastic and/or scrim and/or Kraft paper, etc., that are laminated together using an antimony-free adhesive package. For example, the insulation facing stock may comprise an outer foil or polymer layer, a middle scrim (fiber) layer, and an inner Kraft (paper) layer. The layers are bound together by an adhesive, which in the case of the present invention is the inventive antimony-free adhesive package.

In some embodiments a high durability (HD) FSK facing is made with aluminum foil, tri-directional fiberglass and polyester yarns and 30 #unbleached Kraft paper. (In this description, paper may be referred to by its nominal weight, it being understood that the actual weight may differ from the nominal weight by +/−10%, and that other weights may be used if desired.) In other embodiments a standard durability (SD) FSK facing is made with aluminum foil and tri-directional fiberglass yarns, 30 #unbleached Kraft paper. In other embodiments a standard durability (SD) PSK facing is made with a one side white and one side metallized bi-axially oriented polypropylene, tri-directional fiberglass and polyester yarns and 14 #bleached Kraft paper. In other embodiments a (LD) PSK facing is made with white bi-axially oriented polypropylene, tri-directional fiberglass and polyester yarns and 11.5 #unbleached Kraft paper.

Certain embodiments of the inventive antimony-free insulation facing provide superior flame retardant and/or smoke suppression characteristics. For example, the antimony-free insulation facing is preferably formulated using ingredients in amounts effective to provide an antimony-free insulation facing that has a "flame spread" value that does not exceed 25 when tested in accordance with one or more of UL 723, CAN/ULC S102-M88, and ASTM E 84. Similarly, the antimony-free insulation facing is preferably formulated using ingredients in amounts effective to provide an antimony-free insulation facing that has a "smoke developed" value that does not exceed 50 when tested in accordance with one or more of UL 723, CAN/ULC S102-M88, and ASTM E 84.

Certain embodiments of the inventive antimony-free insulation facing provide superior operating temperature characteristics. For example, the antimony-free insulation facing is preferably formulated using ingredients in amounts effective to provide an antimony-free insulation facing that performs effectively in the temperature range of 0° F. to 450° F. (−18° C. to 232° C.) when measured by ASTM C 411 and/or ASTM D 1790.

Certain embodiments of the inventive antimony-free insulation facing provide superior anti-corrosiveness characteristics. For example, the antimony-free insulation facing is preferably formulated using ingredients in amounts effective to provide an antimony-free insulation facing that will not accelerate corrosion of aluminum, steel or copper, and will not delaminate, when tested in accordance with ASTM C 665 (accelerated aging 30 days 95% RH 120 degrees F.)

Certain embodiments of the inventive antimony-free insulation facing provide superior corrosion characteristics. For example, the antimony-free insulation facing is preferably formulated using ingredients in amounts effective to provide an antimony-free insulation facing that has a corrosion rate in mils/yr that will not exceed that of the 1 ppm chloride solution, when measured by ASTM C 1617.

Certain embodiments of the inventive antimony-free insulation facing provide superior puncture resistance characteristics. For example, the antimony-free insulation facing is preferably formulated using ingredients in amounts effective to provide an antimony-free insulation facing that has a puncture resistance of at least 25 (Beach units) for FSK and/or PSK facings, at least 50 (Beach units) for ASJ facing, and at least 120 (Beach units for ASJ+ Facing when measured by TAPPI Test T803.

Certain embodiments of the inventive antimony-free insulation facing provide superior water vapor transmission characteristics. For example, the antimony-free insulation facing is preferably formulated using ingredients in amounts effective to provide an antimony-free insulation facing that has a maximum Permeance (water vapor transmission rate) of 0.02 perms for FSK, PSK SD and ASJ vapor retarders and PSK LD of 0.09 perms when measured by ASTM E 96, Procedure A.

Certain embodiments of the inventive antimony-free insulation facing provide superior water vapor sorption characteristics. For example, the antimony-free insulation facing is preferably formulated using ingredients in amounts effective to provide an antimony-free insulation facing that has a water vapor sorption of less than 5% by weight when exposed to air at 120° F. (49° C.) and 95% humidity for 96 hours when measured by ASTM C 1104.

Certain embodiments of the inventive antimony-free insulation facing provide superior shrinkage characteristics. For example, the antimony-free insulation facing is preferably formulated using ingredients in amounts effective to provide an antimony-free insulation facing that has less than 0.3% linear shrinkage when measured by ASTM C 356.

Certain embodiments of the inventive antimony-free insulation facing provide superior microbial growth resistance characteristics. For example, the antimony-free insulation facing is preferably formulated using ingredients in amounts effective to provide an antimony-free insulation facing that does not promote or support the growth of mold, fungi or bacteria when measured by ASTM C 1338 and/or G21.

Certain embodiments of the inventive antimony-free insulation facing provide superior water immersion characteristics. For example, the antimony-free insulation facing is preferably formulated using ingredients in amounts effective to provide an antimony-free insulation facing that does not delaminate when immersed in water for 24 hours at 23° C.

The inventive antimony-free insulation facing may be used to make an insulation product. As is known to the art, insulation products may be faced with an insulation facing material, which in the case of the present invention is the inventive antimony-free insulation facing. The insulation products may include, for example, rolls, batts, board, molded of fiberglass or mineral wool insulation and foam board may be provided with the inventive insulation facing material having the inventive adhesive package.

In addition to the insulation facing stock and insulation products provided by the present invention, the inventive adhesive package may also be used in other applications in which an effective Red List-free adhesive package may be desired. For example, insulation materials made from recycled wood or paper products may utilize the inventive adhesive packages.

In view of the foregoing it can be seen that one embodiment of the present invention provides an antimony-free adhesive package for use in making an insulation material; wherein the adhesive package comprises, or consists of, or consists essentially of:

between 3% and 10%, more preferably about 3.5% to 8%, and most preferably about 4%, of a zinc molybdate/magnesium silicate complex such as Kemgard 911c;

between 3% and 10%, more preferably about 3.5% to 10%, and most preferably about 4%, of a zinc phosphate/zinc oxide complex such as Kemgard 981;

between 13% and 26%, more preferably about 15% to 22%, and most preferably about 16% to 18%, of a halogenated latex adhesive such as DL-259;

between 22% and 50%, more preferably about 25% to 45%, and most preferably about 30 to 40%, of a flame quench and/or smoke suppressant such as aluminum trihydrate;

between 2% and 8%, more preferably about 4% to 6%, and most preferably about 5%, of an intumescent such as ammonium polyphosphate;

between 10% and 25%, more preferably about 10% to 20%, and most preferably about 15% to 17%, of a first non-flammable gas generator such as melamine;

between 10% and 25%, more preferably about 13% to 22%, and most preferably about 16% to 20%, of a second non-flammable gas generator such as melamine cyanurate;

between 0.5% and 3%, more preferably about 1% to 2%, and most preferably about 1% to 1.4%, of a mold and mildew inhibitor such as Polyphase 678.

In other embodiments the antimony-free adhesive package comprises the foregoing plus between 0.5% and 2.5%, more preferably about 0.8% to 2%, and most preferably about 1% to 1.5%, of a dispersant such as Tamol.

In other embodiments the antimony-free adhesive package comprises the foregoing plus between 0.0001% and 2%, more preferably about 0.001% to 1%, and most preferably about 0.01%, of a water holding agent such as carboxymethyl cellulose.

It can additionally be seen that one embodiment of the present invention provides an antimony-free adhesive package for use in making an insulation material; wherein the adhesive package comprises, or consists of, or consists essentially of:

between 13% and 26%, more preferably about 15% to 22%, and most preferably about 16% to 18%, of a halogenated latex adhesive such as DL-259;

between 20% and 60%, more preferably about 30% to 50%, and most preferably about 35 to 45%, of a flame quench and/or smoke suppressant such as aluminum trihydrate;

between 2% and 10%, more preferably about 4% to 7%, and most preferably about 5% to 6%, of an intumescent such as ammonium polyphosphate;

between 10% and 25%, more preferably about 10% to 20%, and most preferably about 15% to 18%, of a first non-flammable gas generator such as melamine;

between 10% and 25%, more preferably about 13% to 22%, and most preferably about 16% to 20%, of a second non-flammable gas generator such as melamine cyanurate;

between 0.5% and 5%, more preferably about 1% to 2%, and most preferably about 1% 10 to 1.4%, of a mold and mildew inhibitor such as Polyphase 67.

In other embodiments the antimony-free adhesive package comprises the foregoing plus between 0.5% and 2.5%, more preferably about 0.8% to 2%, and most preferably about 1% to 1.5%, of a dispersant such as Tamol.

In other embodiments the antimony-free adhesive package comprises the foregoing plus between 0.0001% and 2%, more preferably about 0.001% to 1%, and most preferably about 0.01%, of a water holding agent such as carboxymethyl cellulose.

Preferred formulations of the adhesive package of the present invention are shown in the Tables below.

TABLE 1

Adhesive package with zinc molybdate/magnesium silicate complex and zinc phosphate/zinc oxide complex

| Component | Formulation Amount (%) | Preferred Range | Broad Range | Most Preferred |
|---|---|---|---|---|
| zinc molybdate/magnesium silicate complex (K911c) | 3.9 | 3.5-8 | 3-10 | about 4% |
| zinc phosphate/zinc oxide complex (K981) | 4.3 | 3.5-10 | 3-10 | about 4% |
| halogenated latex adhesive (DL259) | 16.6 | 15-22 | 13-26 | 16-18% |
| flame quench/smoke suppressant (ATH) | 34.8 | 25-45 | 22-50 | 30-40% |
| intumescent (APP) | 4.8 | 4-6 | 2-8 | about 5% |
| inert gas generator (melamine) | 15.6 | 10-20 | 10-25 | 15-17% |
| salt-free and red-list-free flame retardant (melamine cyanurate) | 17.6 | 13-22 | 10-25 | 16-20% |
| mold and mildew inhibitor (polyphase 678) | 1.2 | 1-2 | 0.5-3 | 1-1.4% |
| dispersant (Tamol) | 1.2 | 0.8-2 | 0.5-2.5 | 1-1.5% |
| water holding agent (CMC) | 0.008 | 0.001-1 | 0.0001-2 | about 0.01% |

TABLE 2

Adhesive package without zinc molybdate/magnesium silicate complex and zinc phosphate/zinc oxide complex

| Component | Formulation Amount (%) | Preferred Range | Broad Range | Most Preferred |
|---|---|---|---|---|
| halogenated latex adhesive (DL259) | 16.9 | 15-22 | 13-26 | 16-18% |
| flame quench/smoke suppressant (ATH) | 40.8 | 30-50 | 20-60 | 35-45% |
| intumescent (APP) | 5.6 | 4-7 | 2-10 | 5-6% |
| inert gas generator (melamine) | 16.3 | 10-20 | 10-25 | 15-18% |
| salt-free and red-list-free flame retardant (melamine cyanurate) | 18 | 13-22 | 10-25 | 16-20% |
| mold and mildew inhibitor (polyphase 678) | 1.2 | 1-2 | 0.5-5 | 1-1.4% |
| dispersant (Tamol) | 1.2 | 0.8-2 | 0.5-2.5 | 1-1.5% |
| water holding agent (CMC) | 0.01 | 0.001-1 | 0.0001-2 | about 0.01% |

Figure 2:
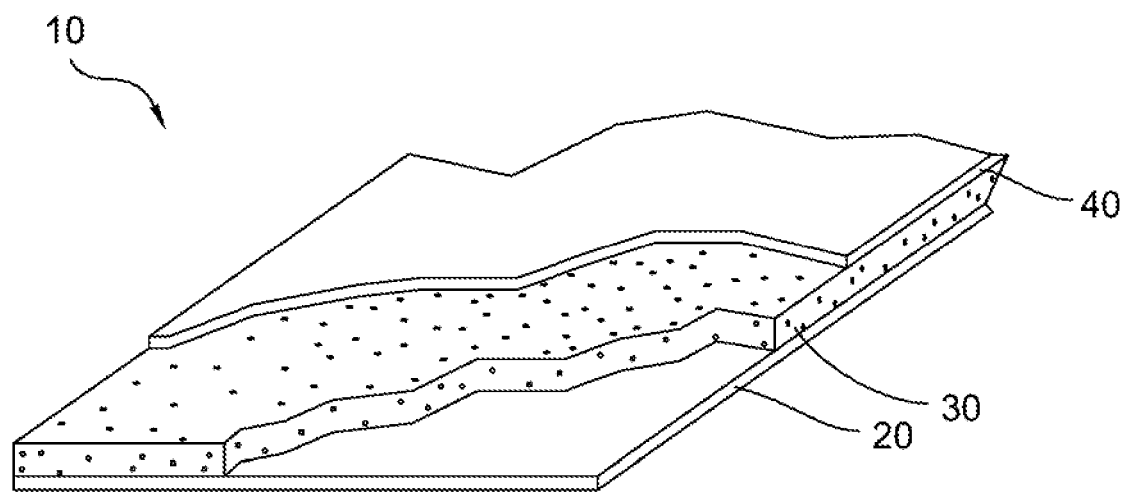
FIG. 2 shows an insulation facing material effective for use on building insulation products, according to one preferred embodiment.

Referring now to the drawings, FIGS. 1 and 2 illustrate the various components of an insulation facing material effective for use on building insulation products, according to one preferred embodiment. FIG. 1 shows the various components before they are bonded together to form a facing material 10. In that pre-bonded condition, the facing material comprises a foil or poly layer 20, a scrim layer 30, a kraft paper layer 40, and an adhesive 50.

To bond the various components together to make the finished facing stock, the adhesive is preferably applied to the inside of the paper, and is then overlaid with the scrim layer and the foil or poly layer. When pressure is applied to press the layers together, the adhesive flows partly through the scrim layer and bonds the paper layer to the foil/poly layer, with the scrim/adhesive between. Pressure is applied to the paper and the foil for a time and at a pressure sufficient to create the laminate.

FIG. 2 shows the insulation facing material after the various layers have been bonded together. Insulation facing stock 10 includes an outer foil or poly layer 20, an inner Kraft paper layer 40, and a central portion comprising scrim layer 30 with adhesive 50 having been hydraulically forced through the scrim layer to hold the kraft paper layer 40 to the scrim layer on one side, and the foil or poly layer 20 to the scrim layer on the other side. The facing stock is made by applying the adhesive to the paper and the poly or foil layer, and then sandwiching the scrim layer between them and applying pressure to the paper and the foil to create the laminate.

Figure 3:
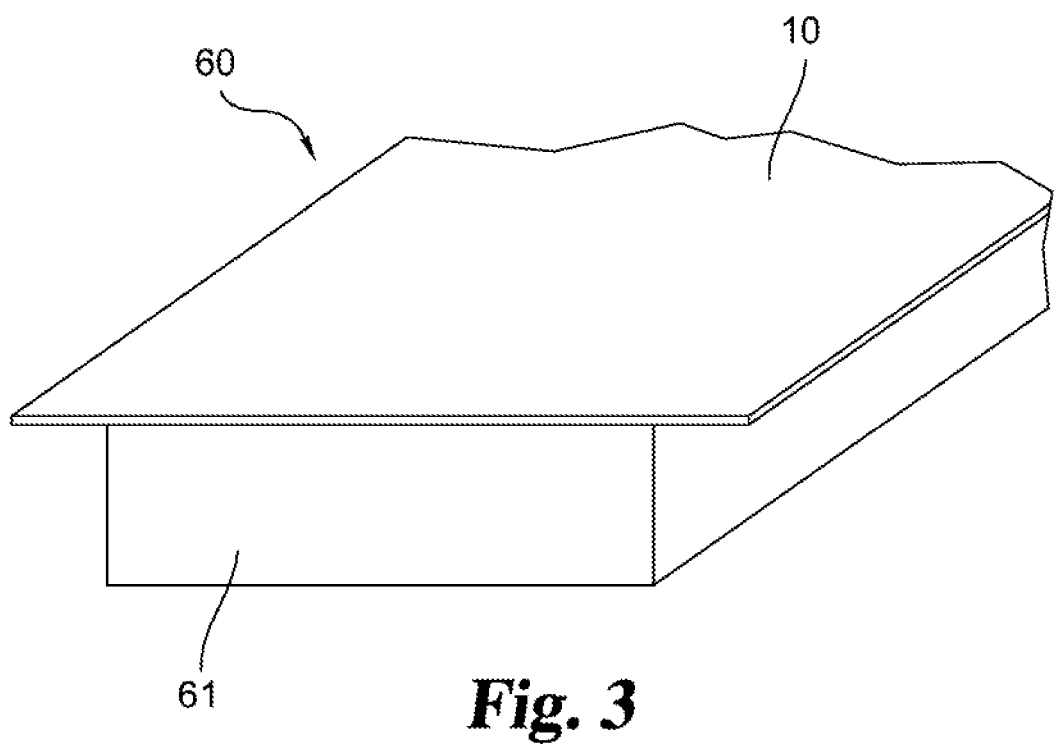
FIG. 3 shows a building insulation product having the facing material of FIG. 1, according to one preferred embodiment.

FIG. 3 shows a building insulation product having the facing material of FIG. 1, according to one preferred embodiment. Building insulation product 60 with an adhesive bonding the insulation batt to the face structure includes insulation material 70 and insulation facing stock 10.

EXAMPLES

To illustrate the materials and methods of the present invention, the following examples are provided. The examples are illustrative of the materials and methods that may be used in the various aspects of the present invention, and are not intended to limit the scope of the materials and methods that may be used, or to limit the scope of the claimed subject matter.

Example 1: Adhesive Make Down Sequence

With Zinc Complexes

An antimony-free adhesive package was made according to the following formulation.

| Ingredient | Wt. % |
|---|---|
| Zinc molybdate/magnesium silicate complex | 3.9 |
| Zinc phosphate/zinc oxide complex | 4.3 |
| DL 259 (carboxylated vinylidene halogenated butadiene latex adhesive) | 16.6 |
| ATH (SB 432) (aluminum trihydrate) | 34.8 |
| APP (aluminum polyphosphate) | 4.8 |
| Melamine | 15.6 |
| MC-25 (melamine cyanurate) | 17.6 |
| Polyphase 678 (IPBC-based mold and mildew inhibitor) | 1.2 |
| Tamol (hydrophobic copolymer polyelectrolyte dispersant) | 1.2 |
| Carboxymethyl cellulose | 0.008 |

Five pounds of carboxymethyl cellulose (CMC) is dispersed in 100 pounds water in a first tank. The dispersed CMC is then preferably pumped to a second tank at a level effective to provide 0.5% CMC on the fire-retardant materials (as described above).

A hydrophobic copolymer polyelectrolyte dispersant (e.g., Tamol) is added, along with aluminum trihydrate, and the contents are mixed to disperse. A carboxylated vinylidene halogenated butadiene latex adhesive (e.g., DL 259) is added to the mixing tank, as is ammonium polyphosphate. The contents are mixed to complete the dispersion of APP to that point. Melamine cyanurate (e.g., MC25) is added and mixed in. Melamine powder is added and mixed in. A mold and mildew inhibitor such as Isocil is added and mixed in.

Zinc molybdate/magnesium silicate complex and zinc phosphate/zinc oxide complex are dispersed in a separate tank and are added to the adhesive mixture in line.

Example 2: Adhesive Make Down Sequence without Zinc Complexes

An antimony-free adhesive package was made according to the following formulation.

| Ingredient | Wt. % |
| --- | --- |
| DL 259 (carboxylated vinylidene halogenated butadiene latex adhesive) | 16.9 |
| ATH (SB 432) (aluminum trihydrate) | 40.8 |
| APP (aluminum polyphosphate) | 5.6 |
| Melamine | 16.3 |
| MC-25 (melamine cyanurate) | 18 |
| Polyphase 678 (IPBC-based mold and mildew inhibitor) | 1.2 |
| Tamol (hydrophobic copolymer polyelectrolyte dispersant) | 1.2 |
| Carboxymethyl cellulose | 0.01 |

Five pounds of carboxymethyl cellulose (CMC) is dispersed in 100 pounds water in a first tank. The dispersed CMC is then preferably pumped to a second tank at a level effective to provide 0.5% CMC on the fire-retardant materials (as described above).

A hydrophobic copolymer polyelectrolyte dispersant (e.g., Tamol) is added, along with aluminum trihydrate, and the contents are mixed to disperse. A carboxylated vinylidene halogenated butadiene latex adhesive (e.g., DL 259) is added to the mixing tank, as is ammonium polyphosphate. The contents are mixed to complete the dispersion of APP to that point. Melamine cyanurate (e.g., MC25) is added and mixed in. Melamine powder is added and mixed in. A mold and mildew inhibitor such as Isocil is added and mixed in.

Example 3: Preparation of Facing Stock

Insulation facing stock was made using the adhesive package of Example 1. The facing stock included a PSK SD facing with metalized bi-axially oriented polypropylene and bleached Kraft paper, and an FSK facing with aluminum foil and unbleached Kraft paper. Each of the facing stock materials is made with three layers using the adhesive package of Example 1 to laminate the layers together. The adhesive is applied to the paper and the poly or foil layer, and the scrim is applied with pressure to the paper creating the laminate.

Example 4: Flame Spread and Smoke Developed Testing of Facing Stock

Facing stock made with an adhesive package according to the preset invention was tested for flame spread and for smoke developed, using UL 723, with the following results.

| Sample Description | CFS Calculated Flame Spread | FSI Flame Spread Index | CSD Calculated Smoke Developed | SDI Smoke Developed Index |
| --- | --- | --- | --- | --- |
| PSK-SD w/25HK slit w/white poly side down | 7.59 | 10 | 38.2 | 40 |
| PSK-SD w/25HK Kraft Unslit white side down. | 0 | 0 | 0.9 | 0 |
| PSK-SD w/25HK Poly side Unslit. | 5.09 | 5 | 31.9 | 30 |
| PSK-SD w/25HK Slit Poly white side down | 5.06 | 5 | 39.4 | 40 |
| PSK-SD w/25HK Slit poly white side down | 5.08 | 5 | 31.6 | 30 |
| PSK-SD w/25HK Slit poly white side down | 7.61 | 10 | 43.6 | 45 |
| PSK-SD w/25HK Slit kraft white side down | 5.08 | 5 | 5.1 | 5 |
| PSK-SD w/25HK Slit white Kraft side down | 0.00 | 0 | 5.3 | 5 |
| PSK-SD w/25HK white Kraft side Slit | 0.00 | 0 | 3.2 | 5 |

The flame and smoke testing indicates that insulation facing stock made according to this embodiment of the present invention passes UL testing standards for flame spread and smoke developed.

Example 5: Adhesive Package

Antimony-free adhesive packages are made according to the following formulation.

| Ingredient | Wt. % |
| --- | --- |
| zinc molybdate/magnesium silicate complex (K911c) | 3-10 |
| zinc phosphate/zinc oxide complex (K981) | 3-10 |
| halogenated latex adhesive (DL259) | 13-26 |
| flame quench/smoke suppressant (ATH) | 22-50 |
| intumescent (APP) | 2-8 |
| inert gas generator (melamine) | 10-25 |
| salt-free and red-list-free flame retardant (melamine cyanurate) | 10-25 |
| IPBC-based mold and mildew inhibitor (polyphase 678) | 0.5-5 |
| dispersant (Tamol) | 0.5-2.5 |
| water holding agent (CMC) | 0.001-1 |

Example 6: Adhesive Package

Antimony-free adhesive packages are made according to the following formulation.

| Ingredient | Wt. % |
| --- | --- |
| zinc molybdate/magnesium silicate complex (K911c) | 3.5-8 |
| zinc phosphate/zinc oxide complex (K981) | 3.5-10 |
| halogenated latex adhesive (DL259) | 15-22 |
| flame quench/smoke suppressant (ATH) | 25-45 |
| intumescent (APP) | 4-6 |
| inert gas generator (melamine) | 10-20 |
| salt-free and red-list-free flame retardant (melamine cyanurate) | 13-22 |
| mold and mildew inhibitor (polyphase 678) | 1-2 |
| dispersant (Tamol) | 0.8-2 |
| water holding agent (CMC) | 0.001-1 |

Example 7: Adhesive Package

Antimony-free adhesive packages are made according to the following formulation.

| Ingredient | Wt. % |
|---|---|
| zinc molybdate/magnesium silicate complex (K911c) | about 4% |
| zinc phosphate/zinc oxide complex (K981) | about 4% |
| halogenated latex adhesive (DL259) | 16-18% |
| flame quench/smoke suppressant (ATH) | 30-40% |
| intumescent (APP) | about 5% |
| inert gas generator (melamine) | 15-17% |
| salt-free and red-list-free flame retardant (melamine cyanurate) | 16-20% |
| mold and mildew inhibitor (polyphase 678) | 1-1.4% |
| dispersant (Tamol) | 1-1.5% |
| water holding agent (CMC) | about 0.1% |

Example 8: Adhesive Package

Antimony-free adhesive packages are made according to the following formulation.

| Ingredient | Wt. % |
|---|---|
| halogenated latex adhesive (DL259) | 13-26 |
| flame quench/smoke suppressant (ATH) | 20-60 |
| intumescent (APP) | 2-10 |
| inert gas generator (melamine) | 10-25 |
| salt-free and red-list-free flame retardant (melamine cyanurate) | 10-25 |
| IPBC-based mold and mildew inhibitor (polyphase 678) | 0.5-5 |
| dispersant (Tamol) | 0.5-2.5 |
| water holding agent (CMC) | 0.0001-2 |

Example 9: Adhesive Package

Antimony-free adhesive packages are made according to the following formulation.

| Ingredient | Wt. % |
|---|---|
| halogenated latex adhesive (DL259) | 15-22 |
| flame quench/smoke suppressant (ATH) | 30-50 |
| intumescent (APP) | 4-7 |
| inert gas generator (melamine) | 10-20 |
| salt-free and red-list-free flame retardant (melamine cyanurate) | 13-22 |
| mold and mildew inhibitor (polyphase 678) | 1-2 |
| dispersant (Tamol) | 0.8-2 |
| water holding agent (CMC) | 0.001-1 |

Example 10: Adhesive Package

Antimony-free adhesive packages are made according to the following formulation.

| Ingredient | Wt. % |
|---|---|
| halogenated latex adhesive (DL259) | 16-18% |
| flame quench/smoke suppressant (ATH) | 35-45% |
| intumescent (APP) | 5-6% |
| inert gas generator (melamine) | 15-18% |
| salt-free and red-list-free flame retardant (melamine cyanurate) | 16-20% |
| mold and mildew inhibitor (polyphase 678) | 1-1.4% |
| dispersant (Tamol) | 1-1.5% |
| water holding agent (CMC) | about 0.1% |

Example 11: Flame Spread and Smoke Developed Testing of FSK Facing Stock

FSK facing stock made with an adhesive package according to the present invention was tested for flame spread and for smoke developed, using UL 723, tenth edition, with the following results. The test was for the Kraft paper side unslit.

| FLAME SPREAD RESULTS Flame Spread Data | |
|---|---|
| Distance (Feet) | Time (Sec) |
| Ignition | 4 |
| 0.5 | 5 |
| 1 | 7 |
| 1.5 | 8 |
| 2 | 9 |
| 3 | 11 |
| 4 | 14 |
| 4.5 | 16 |

| | |
|---|---|
| Calculated Flame Spread (CFS): | 22.80 |
| Flame Spread Index (FSI): | 25 |
| Time to Ignition (sec): | 4 |
| Maximum Flame Spread (ft): | 4.5 |
| Area Under the Flame Spread Curve (ft.-min): | 44.3 |
| SMOKE RESULTS | |
| Calculated Smoke Developed (CSD): | 4.8 |
| Smoke Developed Index (SDI): | 5 |
| Area Under the Smoke Curve (Obs-min.): | 4.27 |
| Area Under Red Oak Curve (Obs-min.): | 88.41 |
| Post-Test Observations | |
| Discoloration (Feet From Burner): | 24 |
| Char (Feet From Burner): | 10 |

Figure 4:
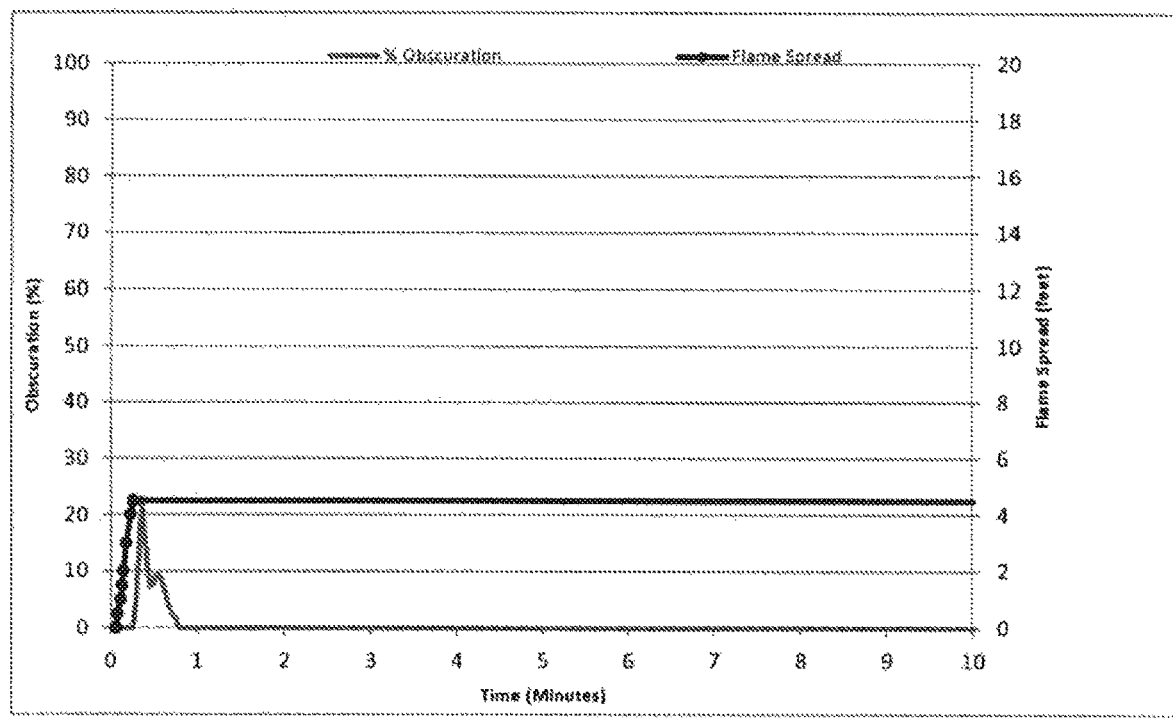
FIG. 4 shows the flame spread and smoke developed data for one test of a facing stock using the an adhesive package according to one aspect of the present invention.

FIG. 4 shows the test results in graphical form.

Example 12: Flame Spread and Smoke Developed Testing of Facing Stock

Facing stock made with an adhesive package according to the present invention was tested for flame spread and for smoke developed, using UL 723, tenth edition, with the following results. The test was for the Kraft paper slit.

| FLAME SPREAD RESULTS Flame Spread Data | |
|---|---|
| Distance (Feet) | Time (Sec) |
| Ignition | 8 |
| 2 | 10 |
| 3.5 | 12 |
| 4.5 | 16 |

| | |
|---|---|
| Calculated Flame Spread (CFS): | 22.78 |
| Flame Spread Index (FSI): | 25 |
| Time to Ignition (sec): | 8 |

-continued

| FLAME SPREAD RESULTS | |
|---|---|
| Flame Spread Data | |
| Maximum Flame Spread (ft): | 4.5 |
| Area Under the Flame Spread Carve (ft.-min): | 44.2 |
| SMOKE RESULTS | |
| Calculated Smoke Developed (CSD): | 10.0 |
| Smoke Developed Index (SDI): | 10 |
| Area Under the Smoke Curve (Obs-min.): | 8.90 |
| Area Under Red Oak Curve (Obs-min.); | 88.41 |
| Post-Test Observations | |
| Discoloration (Feet From Burner): | 24 |
| Char (Feet From Burner): | 10 |

Figure 5:
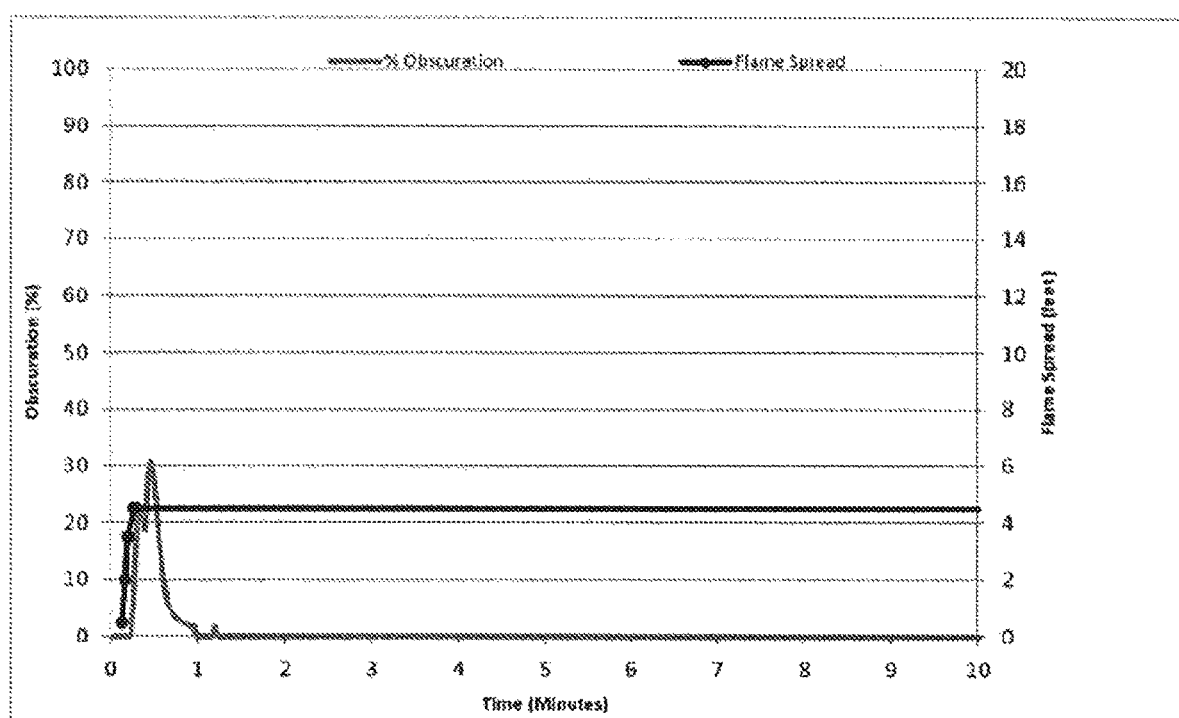
FIG. 5 shows the flame spread and smoke developed data for one test of a facing stock using the an adhesive package according to one aspect of the present invention.

FIG. 5 shows the test results in graphical form.

The inventive adhesive packages find particular utility, as discussed above, in facing stock for insulation rolls, batts, sheets, boards, or molds. However, the adhesive packages also are useful for other purposes such as home furnishings, including furniture, upholstery, mattresses, carpets, curtains, and fabric blinds; electronics and electrical devices, including computers, laptops, phones, televisions, household appliances, and wires and cables; other building and construction materials, including insulation products made of polystyrene and polyurethane insulation foams, and insulation materials made from recycled wood and/or paper products; transportation products, such as seats, seat covers and fillings, bumpers, overhead compartments, and other parts of automobiles, airplanes, and trains.

While the invention has been illustrated and described in detail in the foregoing description and drawings, the same are to be considered as illustrative and not restrictive in character, it being understood that only certain preferred embodiments have been shown and described, and that all changes and modifications that come within the spirit of the invention are desired to be protected.

Additionally, it is to be appreciated that the present invention may comprise or consist essentially of any or all of the described ingredients in their disclosed amounts, and that any or all of the ingredients, amounts, features, elements, and/or embodiments disclosed herein may be combined with any or all of the other ingredients, amounts, features, elements, and/or embodiments disclosed herein to provide an invention that comprises or consists essentially of such ingredients, amounts, features, elements, and/or embodiments.

The grammatical device "and/or" (such as in "A and/or B") is used in this disclosure to mean A alone, or B alone, or both A and B.

The invention claimed is:

1. An insulation facing material comprising a multiplicity of facing material layers laminated together using an antimony-free adhesive package comprising between 3% and 10% by weight of a zinc molybdate/magnesium silicate complex, and between 3% and 10% by weight of a zinc phosphate/zinc oxide complex; wherein the antimony-free adhesive package additionally comprises between 13% and 26% by weight of a halogenated latex adhesive; between 22% and 50% by weight aluminum trihydrate; between 2% and 8% by weight ammonium polyphosphate; between 10% and 25% by weight melamine powder; between 10% and 25% by weight melamine cyanurate; and between 0.5% and 3% by weight mold and mildew inhibitor.

2. The insulation facing material according to claim 1 wherein the antimony-free adhesive package additionally comprises at least one dispersant in an amount of between 0.5% and 2.5% by weight, and carboxymethyl cellulose in an amount of between about 0.0001% and 2% by weight.

3. The insulation facing material according to claim 1 wherein the zinc molybdate/magnesium silicate complex is provided in an amount ranging from about 3.5% and 8% by weight, the zinc phosphate/zinc oxide complex is provided in an amount ranging from about 3.5% and 10% by weight, the halogenated latex adhesive is included in an amount of between 15% and 22% by weight, the aluminum trihydrate is included in an amount of between 25% and 45% by weight, the ammonium polyphosphate is included in an amount of between 4% and 6% by weight, the melamine powder is included in an amount of between 10% and 20% by weight, the melamine cyanurate is included in an amount of between 13% and 22% by weight, and the mold and mildew inhibitor is included in an amount of between 1% and 2% by weight.

4. The insulation facing material according to claim 1 wherein the antimony-free adhesive package additionally comprises at least one dispersant in an amount of between 0.8% and 2% by weight, and carboxymethyl cellulose in an amount of between about 0.0001% and 1% by weight.

5. The insulation facing material according to claim 1 wherein said zinc molybdate/magnesium silicate complex, said zinc phosphate/zinc oxide complex, said halogenated latex adhesive, said aluminum trihydrate, said aluminum ammonium polyphosphate, said melamine powder, said melamine cyanurate, and said mold and mildew inhibitor are included in amounts effective to provide an insulation facing material having a "flame spread" value that does not exceed 25 when tested in accordance with UL 723, CAN/ULC S102-M88, and ASTM E 84.

6. The insulation facing material according to claim 1 wherein said zinc molybdate/magnesium silicate complex, said zinc phosphate/zinc oxide complex, said halogenated latex adhesive, said aluminum trihydrate, said ammonium polyphosphate, said melamine powder, said melamine cyanurate, and said mold and mildew inhibitor are included in amounts effective to provide an insulation facing material having a "smoke developed" value that does not exceed 50 when tested in accordance with UL 723, CAN/ULC S102-M88, and ASTM E 84.

7. The insulation facing material according to claim 1 wherein said zinc molybdate/magnesium silicate complex is provided in an amount of about 4% by weight, the zinc phosphate/zinc oxide complex is provided in an amount of about 4% by weight, the halogenated latex adhesive is included in an amount of between 16% and 18% by weight, the aluminum trihydrate is included in an amount of between 30% and 40% by weight, the aluminum ammonium polyphosphate is included in an amount of about 5% by weight, the melamine powder is included in an amount of between 15% and 17% by weight, the melamine cyanurate is included in an amount of between 16% and 20% by weight, and the mold and mildew inhibitor is included in an amount of between 1% and 1.4% by weight.

8. The insulation facing material according to claim 7 wherein said antimony-free adhesive package additionally comprises at least one dispersant in an amount of between 1% and 1.5% by weight and a carboxymethyl cellulose water holding agent in an amount of about 0.01% by weight.

9. An adhesive package comprising a zinc molybdate/magnesium silicate complex, a zinc phosphate/zinc oxide complex, a halogenated latex adhesive, aluminum trihydrate, ammonium polyphosphate, a melamine powder, a melamine cyanurate, and a mold and mildew inhibitor, wherein the zinc molybdate/magnesium silicate complex is provided in an amount ranging from about 3% to about 10% by weight, the zinc phosphate/zinc oxide complex is provided in an amount ranging from about 3% to about 10% by weight, the halogenated latex adhesive is included in an amount of between 13% and 22% by weight, the aluminum trihydrate is included in an amount of between 22% and 50% by weight, the ammonium polyphosphate is included in an amount of between 2% and 8% by weight, the melamine powder is included in an amount of between 10% and 25% by weight, the melamine cyanurate is included in an amount of between 10% and 25% by weight, and the mold and mildew inhibitor is included in an amount of between 0.5% and 3% by weight.

10. The adhesive package according to claim 9 wherein the zinc molybdate/magnesium silicate complex, the zinc phosphate/zinc oxide complex, the halogenated latex adhesive, the aluminum trihydrate, the ammonium polyphosphate, the melamine powder, the melamine cyanurate, and the mold and mildew inhibitor are included in amounts effective to provide an adhesive package that is effective for producing a "flame spread" value that does not exceed 25 when tested in accordance with UL 723, CAN/ULC S102-M88, and ASTM E 84.

11. The adhesive package according to claim 9 wherein the zinc molybdate/magnesium silicate complex, the zinc phosphate/zinc oxide complex, the halogenated latex adhesive, the aluminum trihydrate, the ammonium polyphosphate, the melamine powder, the melamine cyanurate, and the mold and mildew inhibitor are included in amounts effective to provide an adhesive package that is effective for producing a "smoke developed" value that does not exceed 50 when tested in accordance with UL 723, CAN/ULC S102-M88, and ASTM E 84.

12. The adhesive package according to claim 9 wherein the halogenated latex adhesive, the aluminum trihydrate, the ammonium polyphosphate, the melamine powder, the melamine cyanurate, and the mold and mildew inhibitor are included in amounts effective to provide an adhesive package that is effective for producing a "flame spread" value that does not exceed 25 when tested in accordance with UL 723, CAN/ULC S102-M88, and ASTM E 84.

13. The adhesive package according to claim 9 the halogenated latex adhesive, the aluminum trihydrate, the ammonium polyphosphate, the melamine powder, the melamine cyanurate, and the mold and mildew inhibitor are included in amounts effective to provide an adhesive package that is effective for producing a "smoke developed" value that does not exceed 50 when tested in accordance with UL 723, CAN/ULC S102-M88, and ASTM E 84.

14. The adhesive package according to claim 9 wherein the zinc molybdate/magnesium silicate complex is provided in an amount ranging from about 3.5% and 8% by weight, the zinc phosphate/zinc oxide complex is provided in an amount ranging from about 3.5% and 10% by weight, the halogenated latex adhesive is included in an amount of between 15% and 22% by weight, the aluminum trihydrate is included in an amount of between 25% and 45% by weight, the ammonium polyphosphate is included in an amount of between 4% and 6% by weight, the melamine powder is included in an amount of between 10% and 20% by weight, the melamine cyanurate is included in an amount of between 13% and 22% by weight, and the mold and mildew inhibitor is included in an amount of between 1% and 2% by weight.

15. The adhesive package according to claim 14 wherein said antimony-free adhesive package additionally comprises at least one dispersant in an amount of between 0.8% and 2% by weight, and carboxymethyl cellulose in an amount of between about 0.0001% and 1% by weight.

16. The adhesive package according to claim 9 wherein said zinc molybdate/magnesium silicate complex is provided in an amount of about 4% by weight, the zinc phosphate/zinc oxide complex is provided in an amount of about 4% by weight, the halogenated latex adhesive is included in an amount of between 16% and 18% by weight, the aluminum trihydrate is included in an amount of between 30% and 40% by weight, the aluminum ammonium polyphosphate is included in an amount of about 5% by weight, the melamine powder is included in an amount of between 15% and 17% by weight, the melamine cyanurate is included in an amount of between 16% and 20% by weight, and the mold and mildew inhibitor is included in an amount of between 1% and 1.4% by weight.

17. The adhesive package according to claim 16 wherein said antimony-free adhesive package additionally comprises at least one dispersant in an amount of between 1% and 1.5% by weight, and carboxymethyl cellulose in an amount of about 0.01% by weight.

18. The adhesive package according to claim 9 wherein said antimony-free adhesive package additionally comprises at least one dispersant in an amount of between 0.5% and 2.5% by weight, and carboxymethyl cellulose in an amount of between about 0.0001% and 2% by weight.

19. The adhesive package according to claim 18 wherein the halogenated latex adhesive is included in an amount of between 15% and 22% by weight, the aluminum trihydrate is included in an amount of between 30% and 50% by weight, the ammonium polyphosphate is included in an amount of between 4% and 7% by weight, the melamine powder is included in an amount of between 10% and 20% by weight, the melamine cyanurate is included in an amount of between 13% and 22% by weight, the mold and mildew inhibitor is included in an amount of between 1% and 2% by weight, the dispersant is present in an amount of between 0.8% and 2%, and carboxymethyl cellulose is present in an amount of between about 0.001% and 1%.

20. The adhesive package according to claim 19 wherein the halogenated latex adhesive is included in an amount of between 16% and 18% by weight, the aluminum trihydrate is included in an amount of between 35% and 45% by weight, the ammonium polyphosphate is included in an amount of between 5% and 6% by weight, the melamine powder is included in an amount of between 15% and 18% by weight, the melamine cyanurate is included in an amount of between 16% and 20% by weight, the mold and mildew inhibitor is included in an amount of between 1% and 1.4% by weight, the dispersant is present in an amount of between 1% and 1.5%, and carboxymethyl cellulose is present in an amount of about 0.01%.

21. An adhesive package comprising a zinc molybdate/magnesium silicate complex, a zinc phosphate/zinc oxide complex, a halogenated latex adhesive, aluminum trihydrate, a melamine powder, a melamine cyanurate, and a mold and mildew inhibitor, wherein the zinc molybdate/magnesium silicate complex is provided in an amount ranging from about 3% to about 10% by weight, the zinc phosphate/zinc oxide complex is provided in an amount ranging from about 3% to about 10% by weight, the halogenated latex adhesive is included in an amount of between 13% and 22% by weight, the aluminum trihydrate is included in an amount of between 22% and 50% by weight, the melamine powder is included in an amount of between 10% and 25% by weight, the melamine cyanurate is included in an amount of between 10% and 25% by weight, and the mold and mildew inhibitor is included in an amount of between 0.5% and 3% by weight.

22. The insulation facing material according to claim 21 further comprising an intumescent.

23. The insulation facing material according to claim 22 wherein the intumescent is ammonium polyphosphate.

* * * * *